Figure 1:
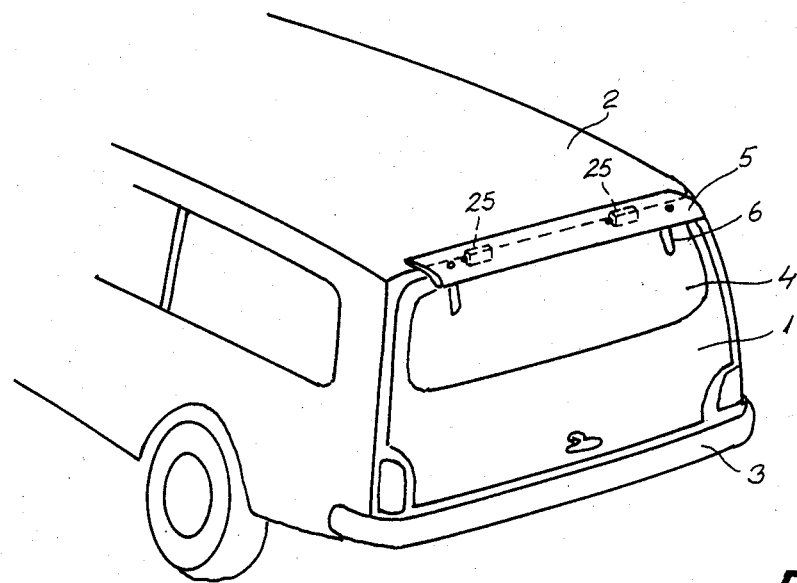

United States Patent [19]

Hansen

[11] Patent Number: 4,726,618
[45] Date of Patent: Feb. 23, 1988

[54] DEFLECTOR FOR DIRECTING DOWNWARDS A FLOW OF AIR ALONG THE SURFACE OF THE REAR WINDOW OF A CAR

[75] Inventor: Helge Hansen, Greve Strand, Denmark

[73] Assignee: Thermoform a/s, Denmark

[21] Appl. No.: 861,499

[22] Filed: May 9, 1986

[30] Foreign Application Priority Data

May 14, 1985 [DK] Denmark .............................. 2114/85

[51] Int. Cl.$^4$ ................................................ B60J 1/20
[52] U.S. Cl. ...................................... 296/91; 296/1 S
[58] Field of Search ... 296/91, 84 B, 95 R (U.S. only), 296/1 S, 106

[56] References Cited

U.S. PATENT DOCUMENTS

| | | | |
|---|---|---|---|
| 3,059,562 | 10/1962 | Sturtevant et al. | 296/91 |
| 3,089,728 | 5/1963 | Shumaker | 296/91 |
| 3,427,067 | 2/1969 | Kish | 296/91 |
| 3,729,223 | 4/1973 | Leissa | 296/106 |
| 3,799,603 | 3/1974 | Bott | 296/1 S |
| 4,179,154 | 12/1979 | Ingram | 296/91 |

FOREIGN PATENT DOCUMENTS

| | | | |
|---|---|---|---|
| 3,116,628 | 11/1982 | Fed. Rep. of Germany | 296/1 S |
| 2501708 | 9/1982 | France | 296/1 S |

*Primary Examiner*—Robert B. Reeves
*Assistant Examiner*—Carol L. Olson
*Attorney, Agent, or Firm*—Ostrolenk, Faber, Gerb & Soffen

[57] ABSTRACT

Deflector apparatus for directing a flow of air downwards along the rear window of a car comprises a curved, elongated deflector plate (5) that is positioned substantially parallel to the rear window with the upper edge of the deflector plate being just above the roof-line (2) of the car and being mounted on the car by means of at least one mounting member. In order to avoid having the mounting members interfere with opening of the rear door (1) of the car and to eliminate the need for drilling of holes in the metal parts of the car, the mounting member (6) is fastened to the glass of the rear window itself, preferably by gluing, so that, without touching the painted metal parts of the car, the deflector plate, will extend above the metal parts of the car and above the rear window (4).

4 Claims, 2 Drawing Figures

DEFLECTOR FOR DIRECTING DOWNWARDS A FLOW OF AIR ALONG THE SURFACE OF THE REAR WINDOW OF A CAR

The present invention relates to a deflector for directing downwards a flow of air along the surface of the rear window of a car and comprising a curved, elongated plate, being placed substantially parallel with the rear window and having its upper edge just above the roof-line of the car and being mounted on the car by means of at least one mounting member.

Deflectors of this kind are known accessories for mounting especially on cars having a rather steep rear window, which is practically in line with the back of the car. The purpose of such deflectors is to direct part of the air flow, passing above the top of the car, downwards along the surface of the rear window of the car in order to prevent dust and dirty water drops, being present in the slipstream of the car, from being deposited on the rear window of the car and thus reduce the visibility through the window. It has been suggested to incorporate the deflector as part of the car body, but this solution is not economically applicable on existing cars in a subsequent mounting of the deflector. The known deflectors for subsequent mounting, therefore, are delivered with mounting members which are screwed or fixed to the painted metal parts of the car. Such mounting has often proved to be connected with considerable drawbacks. In many cases only very little space is available for the mounting on the frame of the rear door of the car, thus preventing a sufficiently strong mounting. In other cases where it has been attempted to fasten the mounting members on the car body itself above the rear door, it has turned out that the mounting members will prevent the opening of the rear door. Finally, most car owners strongly resent having made holes for fastening the mounting members to the car body, and this resentment is very well founded as in many cases it has been found that these holes form the hotbed of later corrosion.

The object of the present invention is to procure a deflector in which these drawbacks are avoided to a substantial degree or totally eliminated.

According to the invention this purpose is attained by securing the mounting member of the deflector to the glass of the rear window itself, the drilling of holes in the car body is avoided.

In practice it is seen that mounting members overlapping the car body without touching it will keep the deflector clear of the roof of the car even when the door is in its fully opened position.

In accordance with the invention the mounting member is fastened to the glass by means of a plate being adhered to the glass by glueing. By using glue for fastening the deflector no provisions except cleaning the window are needed, and the mounting members may later be removed without leaving any traces, the surface of the glass being so hard that it will not be damaged by removing the glue. By means of the plate a sufficiently large glue-surface is obtained.

According to the invention it is advantageous that the mounting members are detachably secured to the glue-plate. In a preferred embodiment of the invention the securing parts of the mounting members comprise a finger placed under an abutment on the glue-plate and a releasable connector. The releasability of the mounting members facilitates the cleaning of the deflector and the car and facilitates the access to the maintenance of the hinges of the rear door, which hinges are normally covered by the deflector. According to a preferred embodiment the connectors are releasable by means of a key.

In order to correctly mount the deflector on most car models using only a single or few types of mounting members, the mounting members according to the invention comprise at least two parts being mutually displaceable and being secured by means of a screw. Preferably, the screw is also adapted to secure the curved plate to the mounting member. By displacing the two parts in relation to each other and by displacing the curved plate in relation to one of the parts, the extension of the mounting member outside the rim of the window can be changed and correspondingly the angle of incidence of the curved plate may be altered so that a correct mounting of the deflector may be achieved on various car types and models.

Figure 2:
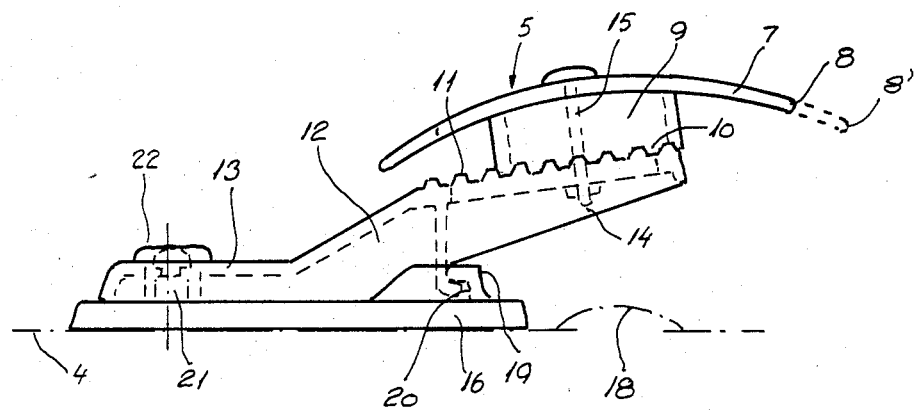

In the following the invention is further described with reference to the drawing in which FIG. 1 schematically and in perspective view shows the rear part of a car being mounted with a deflector according to the invention, and FIG. 2 shows the deflector seen from the end.

Some cars, having a rather steep rear end and a door giving access from the rear to the interior of the car, are exposed to dirt from the road settling on the window of the rear door of the car and thus reduce the visibility through the window. In FIG. 1 the rear part of such type of car is shown.

The rear door 1 of the car is hinged at 25 at the rear edge of the roof 2 of the car and is adapted to be opened upwards from the bumper of the car so that the door in its opened position forms an open shed over the opening of the door. The rear door is normally provided with a window 4, enabling the driver to look backwards from his seat. In order to prevent road dirt in the turbulence of the slipstream, arising when the car moves, from settling on the rear window of the car, a deflector 5 is placed above the window and has its front edge placed just above the roof-line of the car thereby directing part of the flow of air moving along the roof of the car during driving downwards along the rear window 4. The flow of air thus diverted fills the low pressure just behind the car and thereby prevents the road dirt from being drawn to the rear part of the car and deposited there. In order to prevent drilling of holes for fastening the mounting members the deflector according to the invention is fastened to the rear window of the car by means of glue-plates which are glued to the outer side of the window. In FIG. 1 the mounting members and the glue-plates have the reference number 6.

In FIG. 2 the deflector 5 and its mounting members are shown in more detail, seen from one end thereof. The deflector comprises a curved, elongated plate 7 being so positioned that the front edge thereof, seen in the direction of travel, is just above the roof-line of the car. The plate is secured to a slidable mounting member 9 which supports the plate 7 and also allows the plate, due to the curvature thereof, to be placed higher as indicated with dotted lines at 8'. Opposite the plate 7 the mounting member has a toothing 10 in mesh with a corresponding toothing 11 on a connecting part 12. The connecting part comprises a securing part 13 and an obliquely projecting arm 14 on the upper side of which the toothing 11 is placed. In the mounting member 9 as well as in the projecting arm 14 holes are provided allowing for a screw 15 to be put through the two mounting members regardless of how the two toothings 10, 11 have been connected with each other and also allowing for the curved plate in various positions to be fastened to the slidable mounting member 9. The connecting part 12 is through its securing part secured to a glue-plate 16 which by means of an epoxy, neoprene or silicone glue can be secured to the rear window 4 of the car, the window being shown in dotted lines. Normally the glue-plate is fastened close to the upper rubber list 18 of the rear window. The glue-plate 16 has an abutment 19 with a pocket into which a finger 20 on the obliquely projecting arm 14 of the mounting member is inserted. The glue-plate is further provided with a pin 21 for a connector 22 positioned on the fastening part 13. When the fastening part is placed with the finger 20 under the abutment on the glue-plate 16 and the connector is pressed down on the pin 21, the connecting member and thus the deflector are secured to the car. To release the connector it is preferred to use a key (not shown) which disengages the catches of the connector, after which the deflector can be removed from the car for possible cleaning under the deflector or for examining the hinges of the rear door.

By securing the deflector to the rear window of the car drilling of holes in the metal parts of the car or other damaging of the paint of the car are avoided. The mounting member may be produced from die cast plastic, and a single set of glue-plates and mounting members combined with few variants of the connecting part makes it possible to secure the deflector on a broad variety of cars in need of a deflector.

I claim:

1. In a vehicle having a roof with a rear edge and a rear door hinged at the rear edge of the roof, a rear window in the door, the rear window having an outer surface; a deflector for directing downwards a flow of air along the surface of the rear window and comprising a curved, elongated deflector plate, the deflector plate being placed substantially parallel with the rear window and having an upper edge just above the roof of the vehicle; at least one mounting member means for mounting the deflector plate to the vehicle; a securing plate means connected to the mounting member means and being fastened to the outer surface of the rear window; a releasable connector detachably connecting the mounting member means to the securing plate means; an abutment on the securing plate means, a securing finger extending from the mounting member means to a position under the abutment and the latter being spaced from the connector; said connector being adapted for operation by a key to unlock the connector and thereby permit said mounting member means to be separated from said securing plate means; said mounting member means comprising at least two parts that are relatively displaceable transverse to the length of said deflector plate and are separably secured together; and a first of said at least two parts being attached to the securing plate means by the finger.

2. Deflector according to claim 1, further comprising screw means adapted to secure the deflector plate to another one of said at least two parts.

3. Deflector according to claim 1, wherein the securing plate means is attached to the rear window by being glued to it.

4. Deflector according to claim 2, in which said first part and said another part have interlocking formations that cooperate to maintain a given selected relative position to which said first part and said another part have been displaced.

* * * * *